US008544141B1

(12) United States Patent
Kyde et al.

(10) Patent No.: US 8,544,141 B1
(45) Date of Patent: Oct. 1, 2013

(54) CLEANING CART SYSTEMS

(75) Inventors: Robert W. Kyde, Hamilton, OH (US);
David W. Lloyd, Hamilton, OH (US);
John T. Richter, Hamilton, OH (US);
Robert S. Robinson, Hamilton, OH (US)

(73) Assignee: Kaivac, Inc., Hamilton, OH (US)

( * ) Notice: Subject to any disclaimer, the term of this patent is extended or adjusted under 35 U.S.C. 154(b) by 362 days.

(21) Appl. No.: 12/660,935

(22) Filed: Mar. 4, 2010

Related U.S. Application Data

(60) Provisional application No. 61/209,185, filed on Mar. 4, 2009, provisional application No. 61/284,662, filed on Dec. 21, 2009.

(51) Int. Cl.
| | |
|---|---|
| *A47J 47/18* | (2006.01) |
| *A47L 13/50* | (2006.01) |
| *A47L 17/00* | (2006.01) |
| *A47L 13/52* | (2006.01) |
| *A47L 13/14* | (2006.01) |
| *B65D 25/10* | (2006.01) |
| *B65D 21/02* | (2006.01) |
| *B65D 53/00* | (2006.01) |
| *B65D 81/00* | (2006.01) |
| *A47G 19/00* | (2006.01) |
| *B62B 3/00* | (2006.01) |
| *B62B 11/00* | (2006.01) |

(52) U.S. Cl.
USPC ............. 15/264; 15/260; 15/257.7; 220/772; 220/23.4; 220/23.6; 280/47.34; 280/47.35

(58) Field of Classification Search
USPC ................ 15/264, 257.01, 257.7, 257.9, 260, 15/261; 220/23.2, 23.4, 23.6, 23.8, 768, 220/769, 772, 775, 776, 23.88; 280/47.34, 280/47.35, 79.11, 79.2, 79.5; 248/128, 129, 248/145.6, 907
See application file for complete search history.

(56) References Cited

U.S. PATENT DOCUMENTS

| 2,117,406 | A | * | 5/1938 | Curtis ............................ 68/232 |
| 2,321,981 | A | * | 6/1943 | Bowers ...................... 211/85.21 |
| D156,145 | S | * | 11/1949 | Minnis ........................... D32/53 |
| 2,673,671 | A | * | 3/1954 | Williams ...................... 224/555 |
| 2,840,384 | A | * | 6/1958 | Bard ......................... 280/47.371 |
| 3,409,932 | A | * | 11/1968 | George ........................... 15/260 |
| 3,795,939 | A | * | 3/1974 | Seufert ........................... 15/261 |
| 3,837,667 | A | * | 9/1974 | Sernovitz .................. 280/47.34 |
| 4,650,200 | A | * | 3/1987 | Berfield et al. ............ 280/47.26 |
| 4,713,859 | A | | 12/1987 | Smith, Jr. |
| 4,815,160 | A | | 3/1989 | Smith, Jr. |
| 5,154,359 | A | * | 10/1992 | Junta et al. .................. 280/79.2 |

(Continued)

*Primary Examiner* — Vanitha Elgart
(74) *Attorney, Agent, or Firm* — David E. Pritchard (57) ABSTRACT

In one embodiment, a cleaning cart system of the invention includes a reservoir assembly, an upwardly extending handle releasably connectable to the reservoir assembly, and at least two modular cleaning bins. The reservoir assembly includes a liquid reservoir and an integral wheeled chassis. The liquid reservoir includes a circumferential sidewall and an integral top wall, with the top wall including a plurality of openings. The two modular cleaning bins may be: positioned within the liquid reservoir; positioned on the liquid reservoir top wall with a leg of one bin positioned in one of the top-wall openings, and with a leg of the other bin positioned in another of the top-wall plurality of openings; and alternatively releasably interconnected to one another in a side-by-side orientation, with one of the bins supported on the upwardly extending handle by one or more of a plurality of handle brackets.

32 Claims, 9 Drawing Sheets

(56) References Cited

U.S. PATENT DOCUMENTS

| | | | | |
|---|---|---|---|---|
| 5,414,892 | A | 5/1995 | Clark, Jr. | |
| 5,435,582 | A * | 7/1995 | Davidson | 280/33.992 |
| 5,464,104 | A * | 11/1995 | McArthur | 211/133.3 |
| 5,558,254 | A * | 9/1996 | Anderson et al. | 220/527 |
| 5,649,718 | A * | 7/1997 | Groglio | 280/641 |
| 5,915,723 | A * | 6/1999 | Austin | 280/651 |
| D429,862 | S | 8/2000 | Houry | |
| 6,283,170 | B1 | 9/2001 | Robinson | |
| 6,389,638 | B1 | 5/2002 | Dickinson | |
| 6,494,468 | B1 * | 12/2002 | Inge | 280/47.35 |
| 6,497,423 | B1 * | 12/2002 | Perelli et al. | 280/47.34 |
| 6,550,791 | B2 | 4/2003 | Ramsey | 280/47.19 |
| 7,066,477 | B2 * | 6/2006 | Dubois et al. | 280/79.11 |
| 7,306,245 | B1 * | 12/2007 | Lowe | 280/47.18 |
| 7,364,172 | B1 * | 4/2008 | Archer | 280/79.5 |
| 7,490,745 | B1 | 2/2009 | Robinson | |
| D606,720 | S | 12/2009 | Bergman | |
| 7,661,685 | B2 * | 2/2010 | Thibault | 280/47.35 |
| 7,823,907 | B1 * | 11/2010 | Coholan | 280/652 |
| 8,069,939 | B1 * | 12/2011 | Metzler | 180/19.3 |
| 8,381,931 | B1 * | 2/2013 | Ernest, III | 220/23.88 |
| 2002/0101046 | A1 * | 8/2002 | Potter | 280/47.34 |
| 2002/0120997 | A1 | 9/2002 | Alt | |
| 2003/0020249 | A1 * | 1/2003 | Webster et al. | 280/43 |
| 2003/0042694 | A1 * | 3/2003 | Werner | 280/33.991 |
| 2004/0237243 | A1 * | 12/2004 | Dahl | 15/261 |
| 2005/0006861 | A1 * | 1/2005 | Dubois et al. | 280/33.998 |
| 2005/0076465 | A1 * | 4/2005 | Rousey | 15/264 |
| 2006/0010637 | A1 * | 1/2006 | Duncan et al. | 15/261 |
| 2006/0022419 | A1 * | 2/2006 | Phillips | 280/47.35 |
| 2006/0053579 | A1 * | 3/2006 | Bruno | 15/257.01 |
| 2006/0163827 | A1 * | 7/2006 | Lauer et al. | 280/47.35 |
| 2007/0267832 | A1 * | 11/2007 | Denissov | 280/47.35 |
| 2008/0191437 | A1 * | 8/2008 | Staub | 280/47.34 |
| 2009/0019654 | A1 * | 1/2009 | Lingren | 15/115 |
| 2009/0026732 | A1 * | 1/2009 | Lindner et al. | 280/638 |
| 2009/0174161 | A1 * | 7/2009 | Alves et al. | 280/47.35 |
| 2009/0206569 | A1 * | 8/2009 | Begin et al. | 280/47.35 |
| 2009/0230644 | A1 * | 9/2009 | Stanley | 280/43 |
| 2009/0283989 | A1 * | 11/2009 | Abecassis | 280/651 |
| 2009/0295110 | A1 * | 12/2009 | Wilsher | 280/47.35 |
| 2010/0059950 | A1 * | 3/2010 | Coghill, Jr. | 280/47.26 |
| 2011/0121530 | A1 * | 5/2011 | Young | 280/47.35 |

* cited by examiner

CLEANING CART SYSTEMS

CROSS-REFERENCE TO RELATED APPLICATIONS

This patent document claims the benefit of the filing date of Provisional Application No. 61/209,185, entitled "Modular Mop Bucket System" and filed on Mar. 4, 2009, as well as the benefit of the filing date of Provisional Application No. 61/284,662, entitled "Bin, Bin Assembly, and Bin System" and filed on Dec. 21, 2009. The entire disclosure of each of Provisional Application No. 61/209,185 and Provisional Application No. 61/284,662 is incorporated into this patent document by reference.

FIELD OF THE INVENTION

This invention relates to cleaning carts, and more particularly, to cleaning cart systems in which a given system may be assembled in any of several different configurations.

BRIEF DESCRIPTION OF THE DRAWINGS

The accompanying drawings, which are incorporated into this patent document and constitute a part of this specification, illustrate embodiments of the invention and, together with the general description of the invention given above, and the detailed description of the drawings given below, serve to explain the principles of the invention.

DETAILED DESCRIPTION OF THE DRAWINGS

Figure 1:
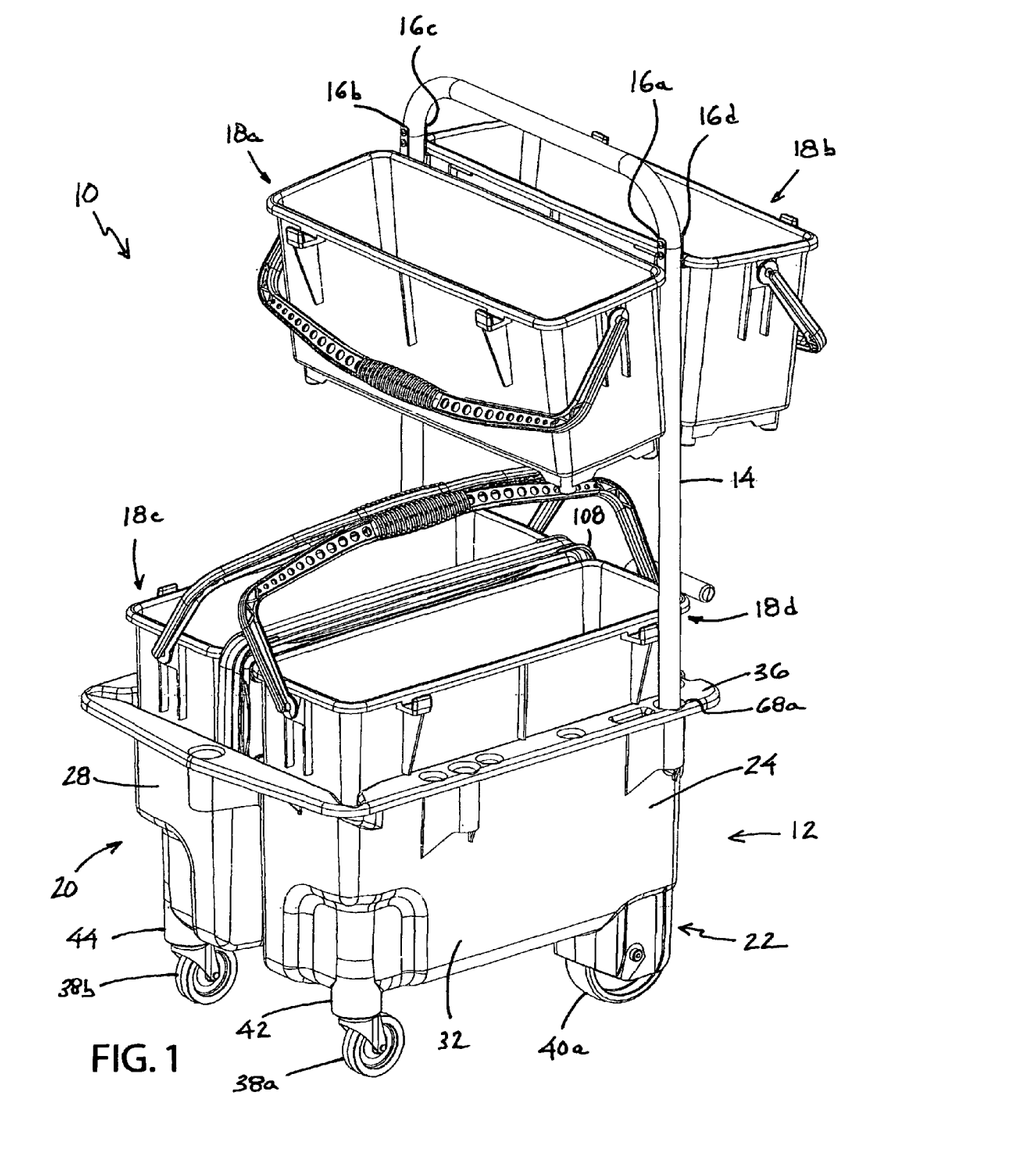
FIG. 1 is a perspective view of an embodiment of the cleaning cart system, in accordance with the principles of the invention.

With reference to FIG. 1, a cleaning cart system 10 in accordance with the principles of the invention has a reservoir assembly 12 and upwardly extending structure in the form of an inverted straight (i.e., planar) generally U-shaped handle 14 removably connected to the reservoir assembly. The handle has support structure in the form of brackets 16a, 16b, 16c, and 16d operable to releasably support multiple modular cleaning bins. The system also has several modular cleaning bins (as at 18a, 18b, 18c, and 18d).

Figure 2:
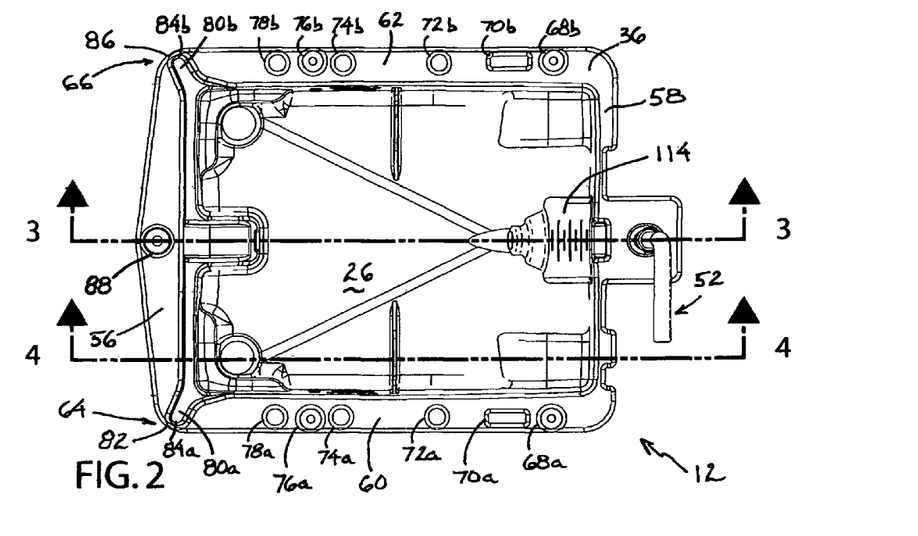
FIG. 2 is an elevated top view of the reservoir assembly of the cleaning cart system of FIG. 1.
Figure 3:
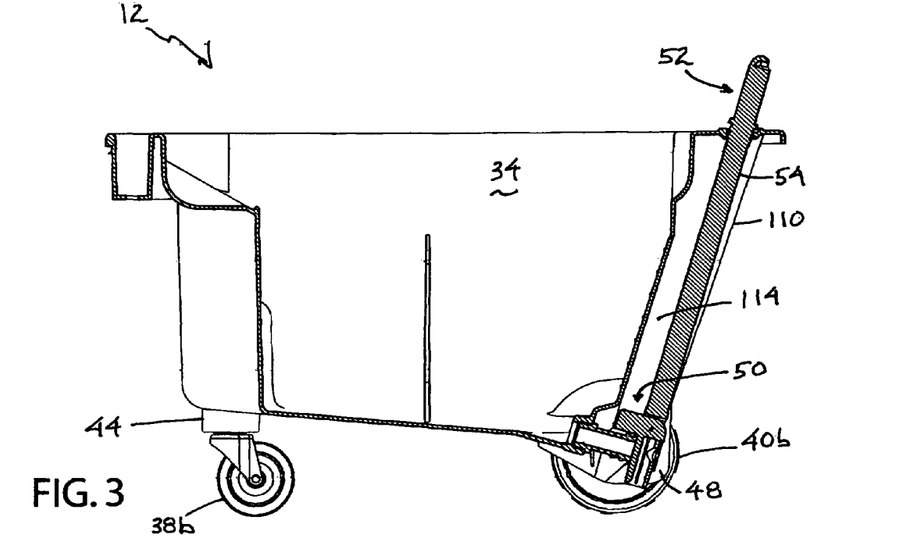
FIG. 3 is a cross-sectional view of the reservoir assembly of FIG. 2, taken along line 3-3 in FIG. 2.
Figure 4:
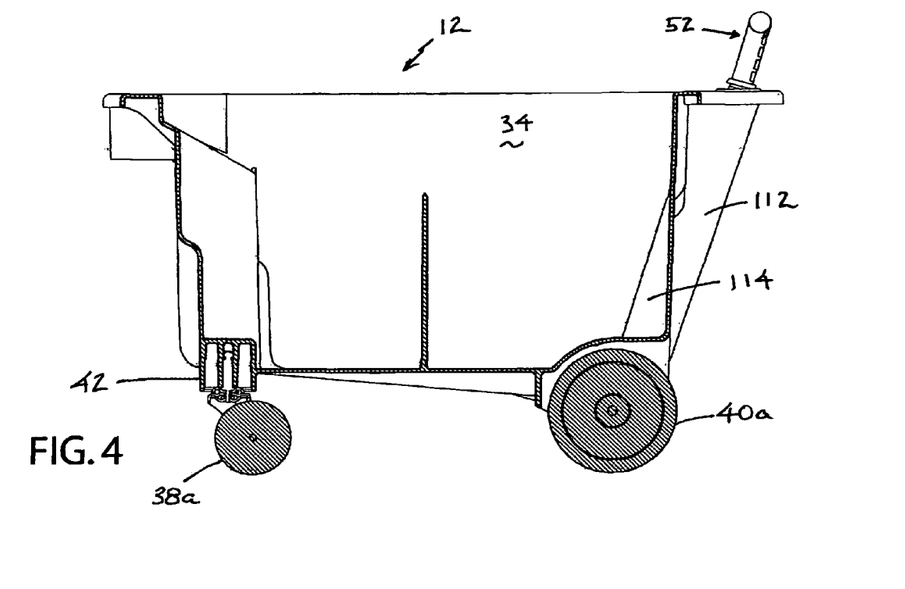
FIG. 4 is another cross-sectional view of the reservoir assembly of FIG. 2, taken along line 4-4 in FIG. 2.
Figure 5:
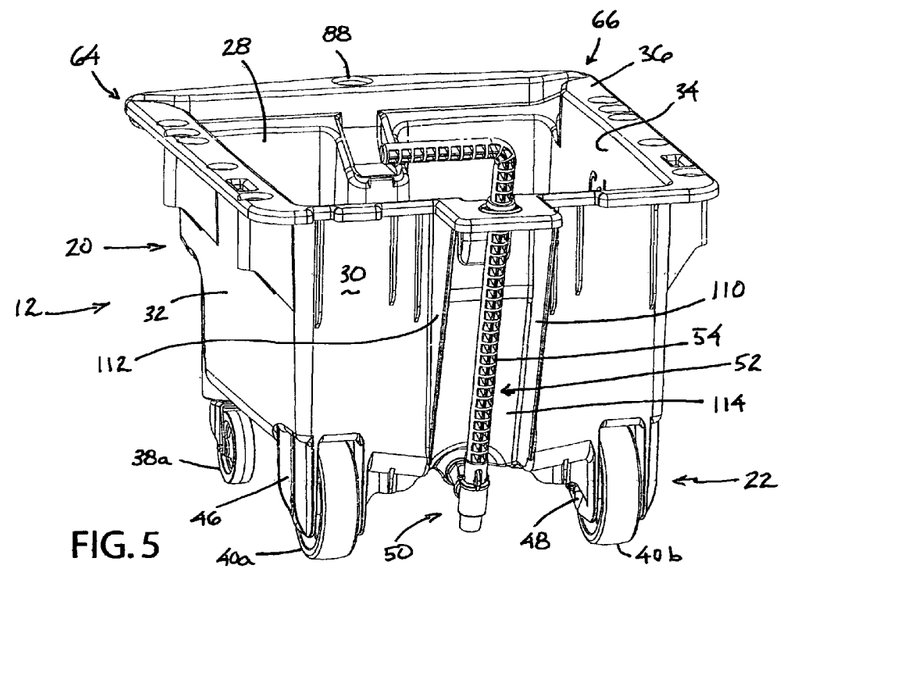
FIG. 5 is a perspective view of the reservoir assembly of the cleaning cart system of FIG. 1.

The reservoir assembly 12 has a reservoir 20 and a wheeled chassis 22 integral with the reservoir. The reservoir has a circumferential sidewall 24 and a bottom wall 26 (FIGS. 2 and 6)—with the circumferential sidewall including a front wall 28, a back wall 30 (FIG. 5), a left sidewall 32, and a right sidewall 34 (FIGS. 3-5). Together, these walls define the reservoir and the interior space within the reservoir—a reservoir capable of holding a cleaning solution or other liquid, or alternatively, any of a number of different cleaning supplies. The circumferential sidewall also has an upper end and a top wall 36 at the upper end. The top wall is integral with the circumferential sidewall, and extends outward away from the circumferential sidewall and reservoir interior space. In addition, the top wall has a number of openings and recessed areas, as discussed in further detail below.

Figures 6, 7:
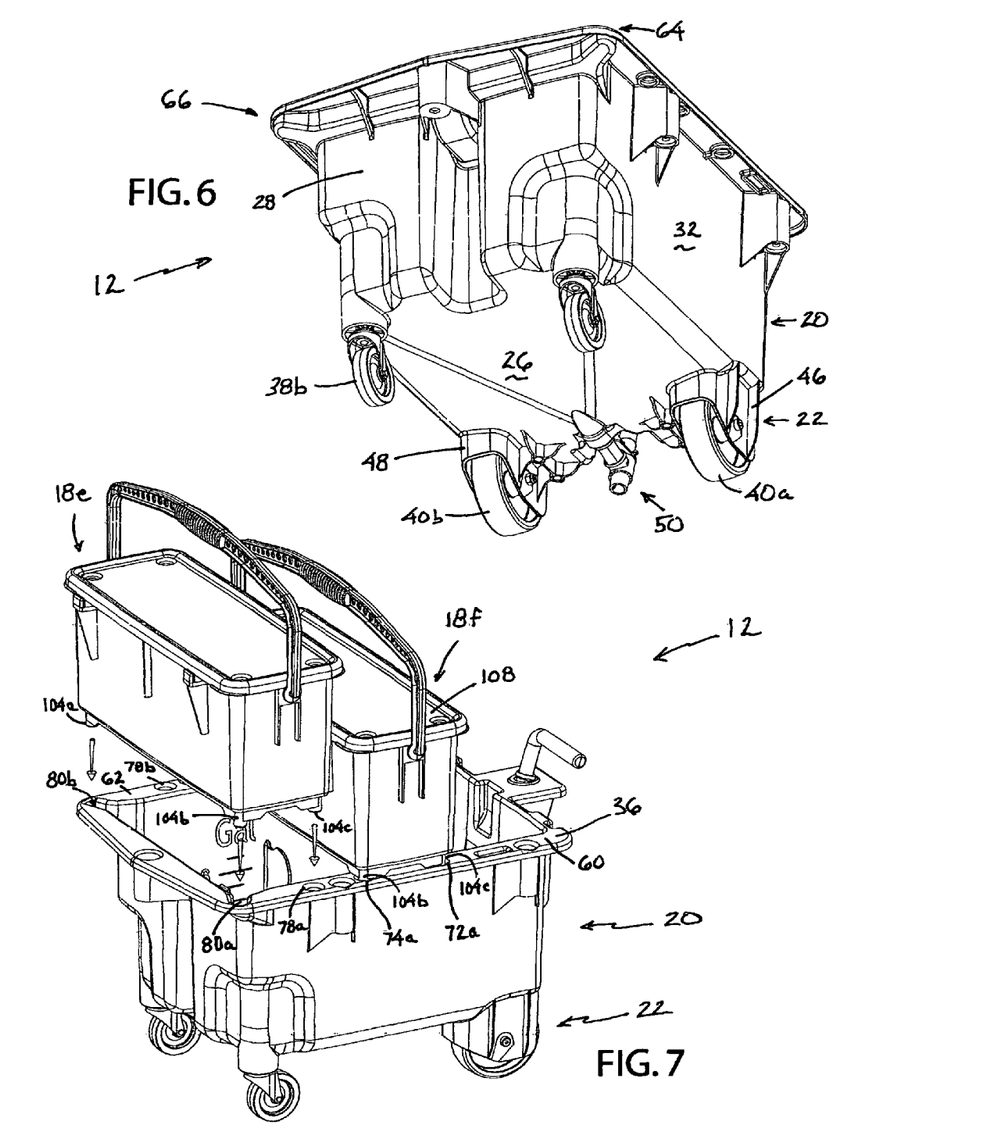
FIG. 6 is a further perspective view of the reservoir assembly of the cleaning cart system of FIG. 1.
FIG. 7 is another perspective view of the reservoir assembly of the cleaning cart system of FIG. 1, further including two modular cleaning bins of the present invention, with the modular cleaning bins positioned on the reservoir assembly.

The chassis 22 includes the structure that supports the wheels. As seen in FIGS. 1-7, the reservoir assembly 12 has four wheels—two swivel casters 38a, 38b at the front, and two fixed-axle wheels 40a, 40b at the back. At the front, the chassis includes a reinforced post or leg 42 at the front lower-left corner, and a reinforced post or leg 44 at the front lower-right corner. As seen in FIG. 4, each of these legs (e.g., leg 42) includes a cylindrical bore for receiving the post of the corresponding caster. At the back, and as best seen in FIGS. 5-7, the chassis includes a wheel frame 46 at the back lower-left corner, and a wheel frame 48 at the back lower-right corner.

With reference to FIGS. 2-7, the reservoir assembly 12 also has a spigot 50 fluidly connected to the reservoir 20, and an extension arm 52 rearward of the back wall 30. The extension arm is connected to the spigot and includes an upwardly extending section 54. A user may operate the spigot between a fully open position and a fully closed position by rotating the extension arm. The spigot makes the cleaning cart system 10 ideal for applying stripper, floor finish, gym finish, or fresh cleaning solution onto a surface in a controlled precise manner. If desired, the spigot also may be used to drain liquid from the reservoir. Additional aspects of the spigot, extension arm, and related features are discussed in further detail below.

As mentioned briefly above, the reservoir 20 has a top wall 36. As perhaps best seen in FIGS. 2 and 5, the top wall also is continuous—extending all the way around the reservoir at the circumferential sidewall 24. In alternate embodiments, however, the top wall does not have to be continuous, and does not have to extend all the way around the reservoir. For example, the top wall may be discontinuous, or may comprise one or more discrete members or segments.

Also as noted briefly above, the top wall 36 has a number of openings and recessed areas—openings and recesses that may be used in various ways. As best seen in FIG. 2, the top wall has a front section 56, a back section 58, a left section 60, and a right section 62—with each top wall section integral with an adjacent top wall section. The front and left sections meet to form a front left corner 64 (FIGS. 2 and 5); and the front and right sections meet to form a front right corner 66 (FIGS. 2 and 5). With reference to FIGS. 1, 2, and 5-7, and moving from the back of the reservoir 20 to the front, the top wall left section has a cylindrical bore 68a, a rectangular opening 70a, a pair of circular openings 72a, 74a, another cylindrical bore 76a, an additional circular opening 78a, and an elongated channel or recessed area 80a—the channel located at the front left corner of the top wall, and formed in conjunction with the top wall front section. As seen in FIGS. 2 and 5, the top wall right section is essentially the mirror image of the top wall left section—including a cylindrical bore 68b, a rectangular opening 70b, a pair of circular openings 72b, 74b, another cylindrical bore 76b, an additional circular opening 78b, and an elongated channel or recessed area 80b—with the channel located at the front right corner of the top wall, and formed in conjunction with the top wall front section. The top wall front left corner 64 has an outer edge 82 (FIG. 2); the channel 80a stops short of the outer edge 82, thereby forming a wall portion 84a (FIG. 2) at an outer end of the channel 80a. In like fashion, the top wall front right corner 66 has an outer edge 86 (FIG. 2). The channel 80b stops short of the outer edge 86, thereby forming a wall portion 84b (FIG. 2) at an outer end of the channel 80b. Referring to FIG. 2, each of these top wall right section features is positioned directly across the reservoir from its corresponding top wall left section feature. The top wall front section 56 has a cylindrical bore 88 at the midpoint of the section. Each of the cylindrical bores has a bottom wall, with the bottom wall including an opening for drainage.

As mentioned in the preceding paragraph, each of these top wall features may be used in a number of different ways—which contributes to the flexibility of the cleaning cart system 10. With reference to FIG. 1, for example, one leg of the inverted generally U-shaped handle 14 is inserted in the cylindrical bore 68a, and the other leg is inserted in the cylindrical bore 68b (FIG. 2). For purposes of illustration, the handle 14 is not shown in FIGS. 2-7. Also, the cleaning cart system may be used, for example, with a different handle (e.g., a handle with a rearward or forward bend), with multiple handles, with one or more poles, or without any upwardly extending structure connected to the bores or other openings. In addition, the bores and other openings may be used to releasably support or hold any of a number of different objects—for example, a wide variety of cleaning or maintenance related tools (e.g., mop handles, broom handles, scrapers, and screwdrivers).

With reference to FIGS. 2 and 5, the elongated channels 80a, 80b (FIG. 2) at the front left and front right corners 64, 66 of the top wall 36 are configured to assist in guiding a liquid from the reservoir 20 when the reservoir contains a liquid and a user chooses to drain the liquid via either the front left corner or the front right corner of the top wall. With reference to FIG. 6, a user may use the downwardly facing exterior surface of a channel 80a, 80b (FIGS. 2 and 5) and/or an adjacent exterior rounded corner edge surface (formed where the reservoir front wall 28 meets the corresponding reservoir sidewall 32 or 34 (FIG. 5)) as a pivoting surface, e.g., against the rim of a toilet, when draining liquid from the reservoir via the left or right front corner 64 or 66.

Figure 10:
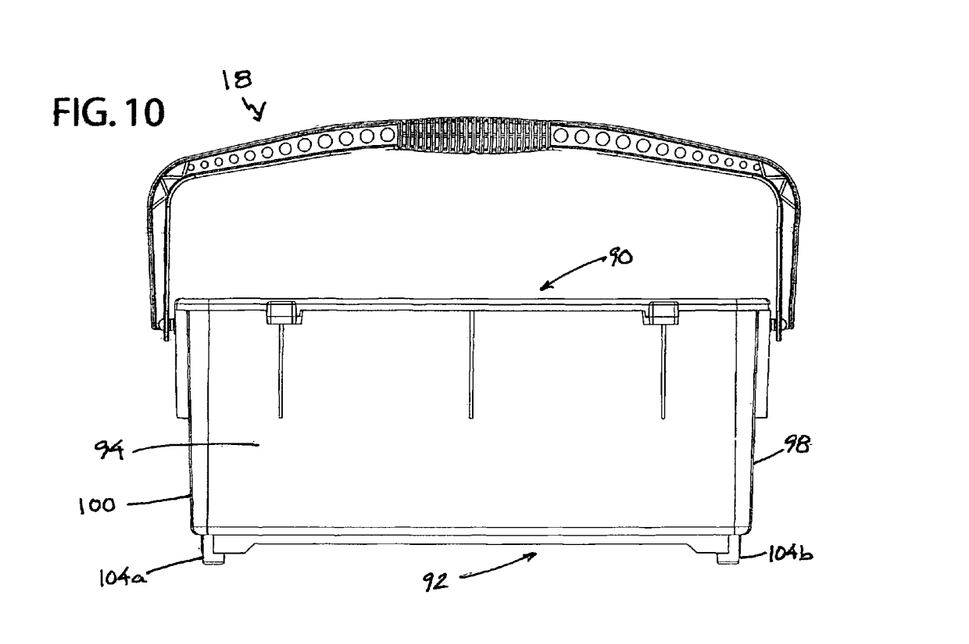
FIG. 10 is an elevated side view of a modular cleaning bin without casters, in accordance with the principles of the invention, in which a first sidewall is featured.
Figure 11:
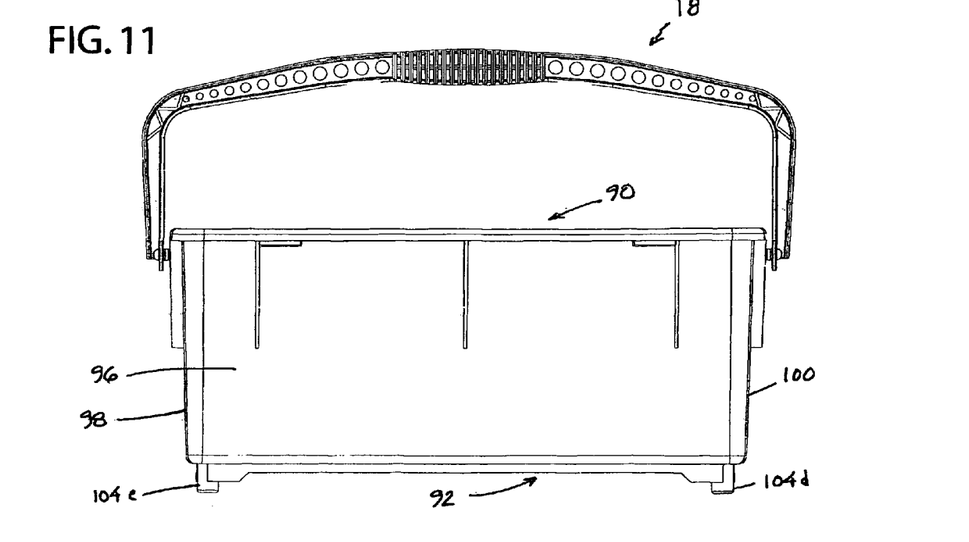
FIG. 11 is an elevated side view of the modular cleaning bin of FIG. 10, in which an oppositely disposed second sidewall is featured.
Figure 12:
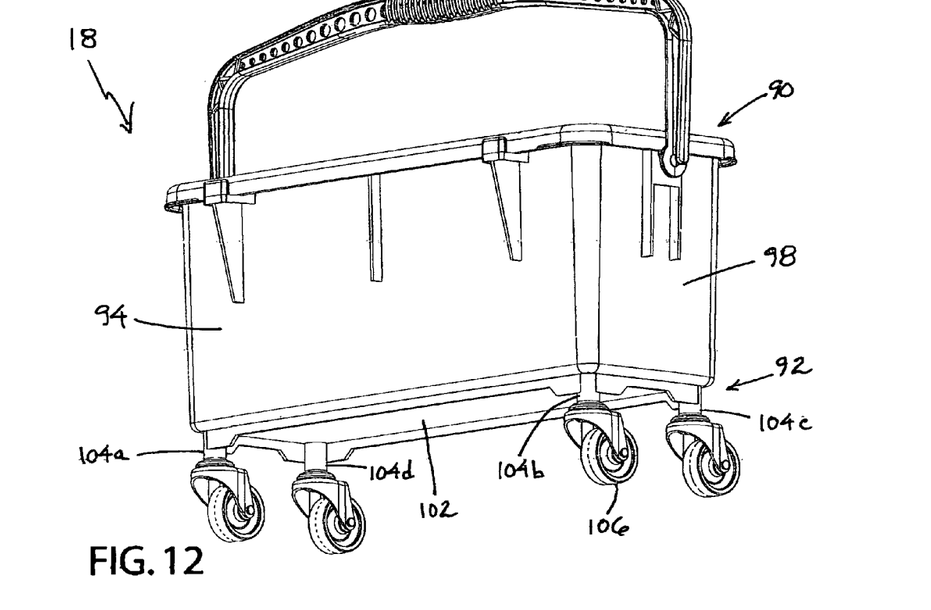
FIG. 12 is a perspective view of one of the three identical modular cleaning bins of FIG. 9.

Referring to FIGS. 1, 7, and 10-12, the particular modular cleaning bin 18 shown includes an upper end 90, a lower end 92, a first sidewall 94, an oppositely disposed second sidewall 96, a first end wall 98, an oppositely disposed second end wall 100, and a bottom wall 102 (FIG. 12). At the bottom wall, each of the four corners includes a downwardly extending base portion in the form of a leg 104a, 104b, 104c, 104d—with the leg having a generally circular cross-section. Each leg includes a bore accessed via an opening at the bottom of the leg—with the leg and bore sized to receive the post of a swivel caster (as at 106, FIG. 12). A user readily may install or remove the casters as desired, depending typically on how the user intends to use the particular modular cleaning bin. Additional aspects of the bin (e.g., the specialized interconnecting or interlocking system) are discussed in detail below.

The versatility of the cleaning cart system, including a few of the ways in which the modular cleaning bins may be removably positioned as a part of the system, is shown in FIGS. 1 and 7. Referring to FIG. 1, four bins 18a, 18b, 18c, and 18d (all without casters) are shown. Two of the bins 18c, 18d are nested side-by-side in the reservoir, in a non-inter-connected inter-connected fashion—with two bin lids (as at 108) securely stowed between the bins. In addition, a bin 18a is releasably hung at the front of the handle 14 and another bin 18b is releasably hung at the back of the handle. If desired, additional bins may be included. For example, using the specialized interlocking system (described below), a bin may be releasably interconnected in a side-by-side orientation with the bin 18a that is shown hanging at the front of the handle. Referring to FIG. 7, two bins 18e, 18f (both without casters) are stably supported on the reservoir top wall 36. For the rearward of the two bins 18f, the two legs 104b, 104c at one end of the bin are positioned in corresponding openings 74a, 72a of the top wall left section 60; and the two legs 104a, 104d (FIGS. 10-12) at the other end of the bin are positioned in corresponding openings 74b, 72b (FIG. 2) of the top wall right section 62. For the bin 18e positioned toward the front of the reservoir, one leg 104c (FIG. 7), 104d (FIGS. 11 and 12) at each end of the bin is positioned in a corresponding opening 78a, 78b of the top wall left section and right section respectively. And the forwardly oriented leg 104b, 104a at each end of the bin is positioned in the corresponding channel 80a, 80b at the top wall front left corner 64 and top wall front right corner 66 respectively. A bin lid (as at 108) is releasably positioned on each of the bins 18e, 18f.

Referring to FIGS. 3-5, the cleaning cart system 10 also has a first protective wall member 110 and a second protective wall member 112 that extend rearward from the reservoir back wall 30 and that are integral with the reservoir back wall—with at least a portion of each of the first and second protective wall members extending rearward of the extension-arm upwardly extending section 54. The first protective wall member is located to the right of the upwardly extending section; and the second protective wall member is located to the left of the upwardly extending section. As seen in FIGS. 2-5, the back wall 30 further has a forwardly oriented recess 114 that extends from a lower end of the back wall in the direction of an upper end of the back wall. As best seen in FIGS. 3 and 4, a portion of the extension-arm upwardly extending section 54 is positioned in the recess. As described above in connection with the cleaning cart system reservoir assembly wheeled chassis 22, the reservoir assembly 12 has a front and a back—with two swivel casters 38a, 38b at the front, and two fixed-axle wheels 40a, 40b at the back (FIGS. 1 and 3-7). As best seen in FIGS. 3 and 4, the wheels 40a, 40b extend rearward of the spigot 50, whereby the wheels 40a, 40b assist in protecting the spigot and the extension arm 52. If desired, a user may move the cleaning cart system up and down a set of stairs by contacting the wheels 40a, 40b or the first and second protective wall members 110, 112 with the stairs.

Figure 8:
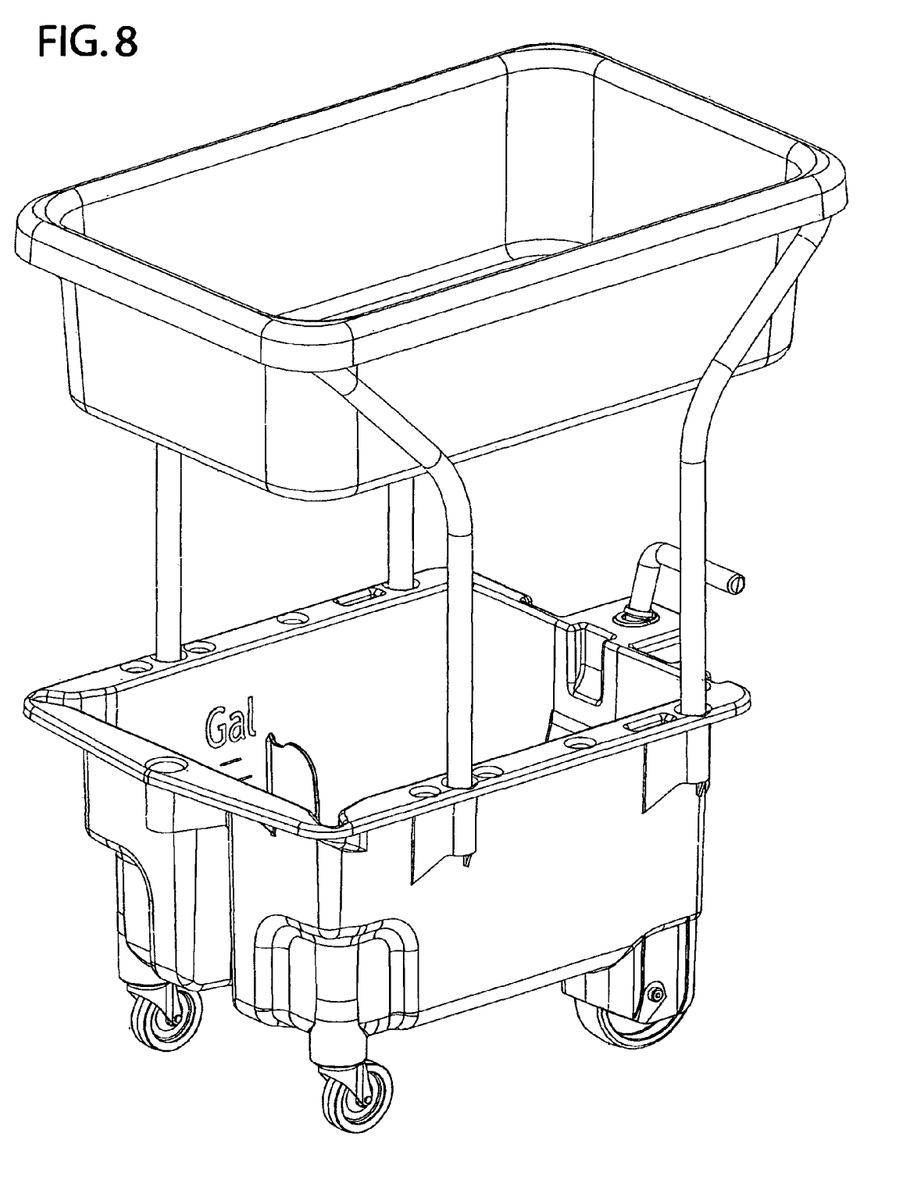
FIG. 8 is a perspective view of a further embodiment of the cleaning cart system, in accordance with the principles of the invention.

With reference to FIG. 8, another cleaning cart system of the invention includes a reservoir assembly, upwardly extending structure in the form of two inverted generally U-shaped handles connected to the reservoir assembly, and a tray or basin releasably mounted on the handles. In further detail, each handle includes a first leg, a second leg, and a cross member (not shown) connecting the first and second legs—with each of the first and second legs having a bend partway along its length. The basin has a peripheral rim; and the rim section at each end of the basin fits over a corresponding handle cross member.

Figure 9:
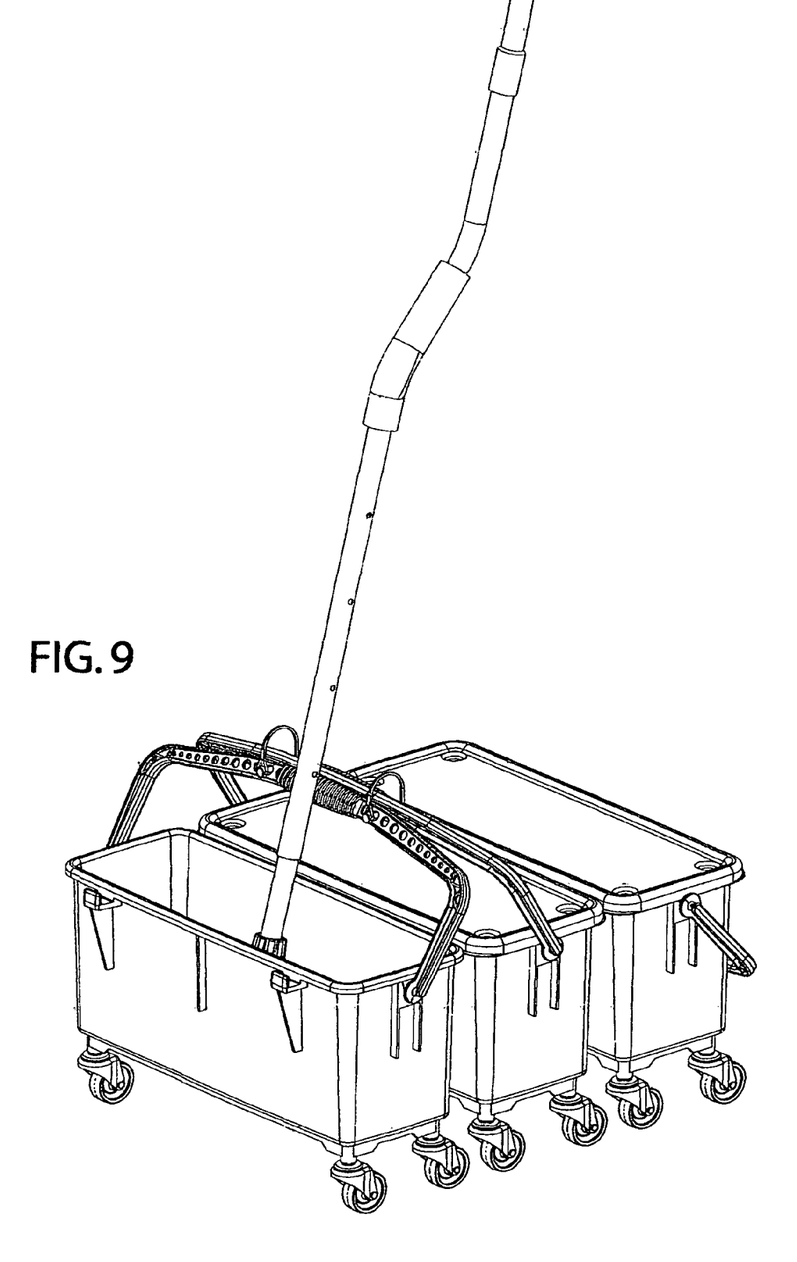
FIG. 9 is a perspective view of yet another embodiment of the cleaning cart system, in accordance with the principles of the invention, in which three identical modular cleaning bins with casters are releasably interconnected in side-by-side relationship.

Referring to FIG. 9, another cleaning cart system of the invention includes three identical modular cleaning bins with casters—with the bins releasably interconnected in side-by-side relationship, using a specialized hook-and-rim system described in detail below. Each bin has a handle including a first end and a second end, with the first end pivotably connected to the bin first end wall, and the second end pivotably connected to the bin second end wall. As seen in FIG. 9, a handle fastening system in the form of two linch pins releasably connects a first bin handle and a second bin handle together in an orientation in which the first and second handles extend above the first and second bins. In this fashion, a mop may be positioned in one of the bins (here, the first bin), with the mop handle of the mop leaning stably against the releasably connected first and second handles.

Figure 13:
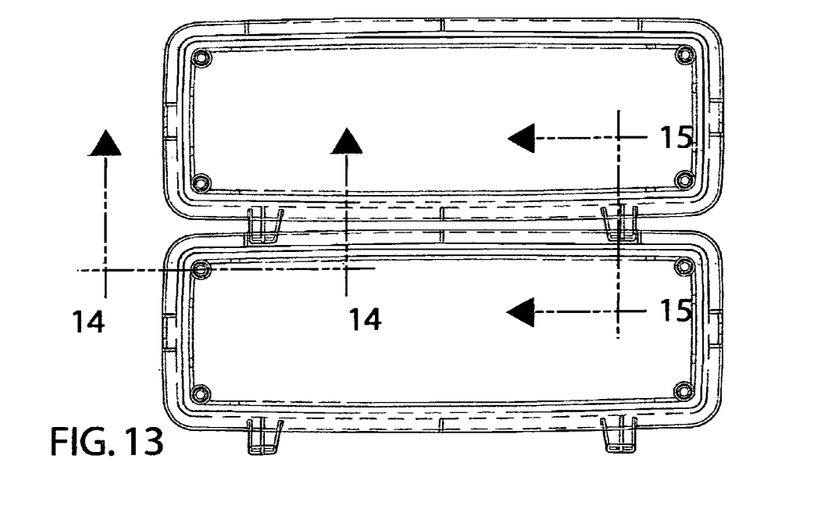
FIG. 13 is an elevated top view of a pair of modular cleaning bins releasably interconnected in side-by-side relationship, with each of the bins being identical to the bin of FIG. 12.
Figure 14:
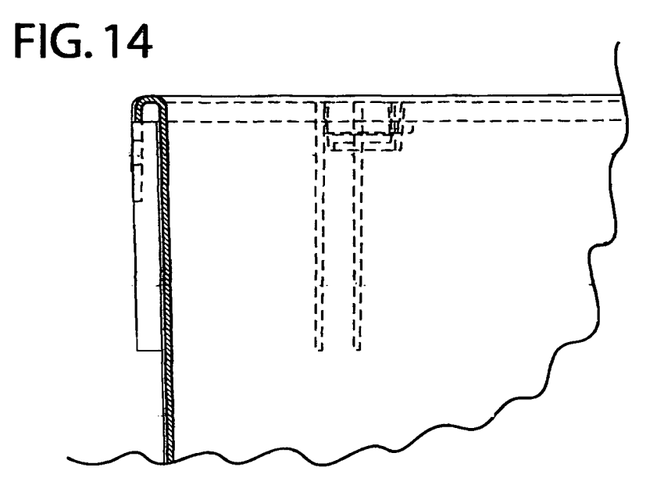
FIG. 14 is a cross-sectional view of a portion of the modular cleaning bins of FIG. 13, taken along line 14-14 in FIG. 13.
Figure 15:
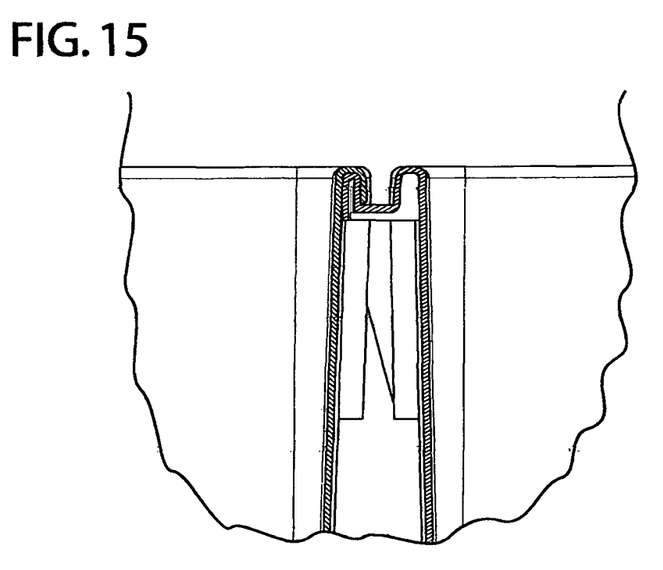
FIG. 15 is a cross-sectional view of a portion of the modular cleaning bins of FIG. 13, taken along line 15-15 in FIG. 13.

With reference to FIGS. 10 and 12, the modular cleaning bin has a first hook and a second hook that extend laterally from an exterior surface of the first sidewall, with both hooks being integral with the first sidewall. The second hook is spaced horizontally from the first hook; and the second hook is vertically spaced between the upper and lower ends of the bin at a level similar to that of the first hook. Each hook has a generally horizontal surface proximate the first sidewall, and a generally vertical surface at an outer end of the horizontal surface. In this fashion, and as shown in FIGS. 13-15, each hook may releasably interconnect or interlock with a corresponding rim section of an adjacent modular cleaning bin.

Referring to FIG. 11, the modular cleaning bin has a first rim section and a second rim section extending outwardly at the upper end of the second sidewall, with both sections being integral with the second sidewall. The first rim section and the first hook are located transversely across from one another; and the second rim section and the second hook are located transversely across from one another. The second sidewall also has first and second stops in the form of first and second ribs—with each rib including a stop surface. As seen in FIGS. 13-15, the first and second stop surfaces limit relative horizontal movement between a modular cleaning bin and an adjacent modular cleaning bin when the bin and adjacent bin are releasably interconnected in a side-by-side orientation.

The cleaning cart systems of the present invention may be made using any suitable material(s) and manufacturing technique(s). For example, if desired, the reservoir assembly and modular cleaning bins may be made of polypropylene using injection molding.

The cleaning cart systems of the invention may be used in any of a number of different ways. For example, they may serve as flexible and low cost microfiber cleaning and waxing systems. In such uses, the result may be a complete multipurpose system for fast, hygienic ergo-mopping and flawless waxing. Perfect for floors, flat surfaces, and touch points, the cleaning cart systems may minimize the risk of cross-contamination. Plus, they can deliver a rapid return on investment by reducing labor and chemical costs while eliminating the need for unnecessary equipment.

Embodiments of the cleaning cart system that include the spigot offer precise flow control—meaning that custodians use only fresh, clean solution. In use, pads (e.g., microfiber pads) typically do not enter the reservoir; and therefore, the cleaning solution remains fresh for more effective cleaning and fewer trips to a custodian closet. Simply changing to a clean microfiber pad removes the soil and reduces or eliminates any threat of cross-contamination.

Built-in splash stops inside the reservoir prevent sloshing and spilling during sudden turns, stops and while going over bumps. These barriers dissipate the waves that are common in mop buckets, thereby providing an ultra-smooth ride.

In one embodiment, the modular cleaning bins are semi-transparent. Each bin is equipped with a handle and tight fitting lid and is designed with legs that nest into another bin's lid for easy, stable stacking. In addition, the special interlocking system enables the bins to be quickly and easily coupled together. Plus, quick connecting casters create instant mobility. As a result, the bins can be used with the reservoir, alone, stacked, carried, or even connected together.

If desired a traditional heavy duty down-pressure wringer may be attached to the reservoir at the back wall, for conventional mopping procedures. And, with such a wringer in place, two bins still may be mounted on the reservoir in front of the wringer—enabling workers to be ready for both conventional and flat mopping, if so desired.

The cleaning cart systems of the invention are perfect for climbing stairs and loading into vehicles. In addition, the lightweight bins can be easily removed, connected or separated, making them ideal for transporting up stairs, between buildings, or across town. They can also be stored and stacked in vehicles, closets, and storerooms.

The cleaning cart systems equip a custodian for many different cleaning challenges around a building. With the appropriate wet or dry microfiber pad, a custodian may use a system for cleaning floors, walls, chalkboards, desktops, lockers, or any other hard surface. In addition, the system's versatile design makes it perfect for a variety of applications. Examples of uses include daily floor cleaning, daily hard-surface cleaning, stripping floors, finishing floors, degreasing kitchens, applying gym floor finish, light-duty restrooms, and salt pick-up. Also, the systems may be used in any of a number of different facilities. Examples include educational facilities, hospitals, nursing homes, retail stores, and office buildings. It is also worth noting that cleaning cart systems of the invention are compatible with existing equipment and janitor carts.

While the present invention has been illustrated by a description of a few embodiments, and while the illustrative embodiments have been described in considerable detail, it is not the intention of the inventor to restrict or in any way limit the scope of the following claims to such detail. Additional advantages and modifications readily will appear to those skilled in the art upon a reading of this patent document. The invention, in its broader aspects, is therefore not limited to the specific details, representative apparatus and methods, and illustrative examples shown and described in this patent document.

What is claimed is:

1. A cleaning cart system, comprising:
   a reservoir assembly, an upwardly extending handle, and at least two modular cleaning bins releasably interconnectable in a side-by-side orientation;
   the reservoir assembly including a wheeled chassis and a liquid reservoir integral with the wheeled chassis;
   the liquid reservoir comprising a circumferential sidewall, a back wall, and an integral top wall;
   the top wall comprising a plurality of openings;
   the upwardly extending handle releasably connected to the reservoir assembly via one or more of the plurality of openings, the upwardly extending handle including a plurality of brackets; a spigot fluidly connected to the liquid reservoir; an extension arm rearward of the back wall, the extension arm connected to the spigot and including an upwardly extending section, whereby a user may operate the spigot between a fully open position and a fully closed position by rotating the extension arm; and the cleaning cart system constructed and arranged whereby two of the at least two modular cleaning bins: may be positioned within the liquid reservoir; may be positioned on the liquid reservoir top wall with a downwardly extending base portion of one of the modular cleaning bins positioned in one of the top-wall plurality of openings, and with a downwardly extending base portion of another of the modular cleaning bins positioned in another of the top-wall plurality of openings; and may be releasably interconnected to one another in a side-by-side orientation, with one of the modular cleaning bins supported on the upwardly extending handle by one or more of the plurality of brackets.

2. The cleaning cart system of claim 1 wherein the top wall includes a first section at one of a liquid reservoir front right portion and a liquid reservoir front left portion, the first section including a channel, the channel configured to assist in guiding a liquid from the liquid reservoir when the liquid reservoir contains a liquid and a user chooses to drain the liquid via the first section of the top wall.

3. The cleaning cart system of claim 1 further comprising a first protective wall member that extends rearward from the back wall and that is integral with the back wall, at least a portion of the first protective wall member extending rearward of the extension-arm upwardly extending section.

4. A cleaning cart system, comprising: a reservoir assembly, the reservoir assembly including a wheeled chassis and a liquid reservoir integral with the wheeled chassis, the reservoir assembly further including a wall at a portion of the periphery of the reservoir assembly, the wall integral with and extending outward away from the reservoir assembly and comprising a plurality of openings; and upwardly extending structure removably connectable to the reservoir assembly via one or more of the plurality of openings, the upwardly extending structure including a handle, whereby a user may maneuver and steer the cleaning cart system via the handle, the liquid reservoir including a right side and a left side, with one of the openings at the right side and another of the openings at the left side, the handle including a first leg insertable into the right side opening, a second leg insertable into the left side opening, and a cross member connecting the first and second legs.

5. The cleaning cart system of claim 4 wherein the upwardly extending structure includes support structure operable to releasably support a cleaning bin.

6. The cleaning cart system of claim 5 wherein the support structure includes a bracket.

7. A cleaning cart system, comprising: a reservoir assembly, the reservoir assembly including a wheeled chassis and a liquid reservoir integral with the wheeled chassis, the reservoir assembly further including a wall at a portion of the periphery of the reservoir assembly, the wall integral with the reservoir assembly and comprising a plurality of openings; upwardly extending structure removably connectable to the reservoir assembly via one or more of the plurality of openings; the liquid reservoir comprising a circumferential sidewall including an upper end, with the wall that is at the portion of the periphery of the reservoir assembly being at the liquid reservoir upper end, the wall comprising a top wall of the liquid reservoir, the top wall extending outward away from the liquid reservoir; and at least one of the plurality of openings constructed and arranged to releasably receive a downwardly extending base portion of a cleaning bin.

8. The cleaning cart system of claim 7 wherein the upwardly extending structure includes
support structure operable to releasably support a cleaning bin.

9. The cleaning cart system of claim 8 further comprising a cleaning bin, the cleaning cart system constructed and arranged whereby the cleaning bin: may be positioned within the liquid reservoir; may be positioned on the liquid reservoir assembly with a downwardly extending base portion of the bin positioned in one of the plurality of openings; and may be releasably supported by the support structure of the upwardly extending structure.

10. A cleaning cart system, comprising: a reservoir assembly, the reservoir assembly including a wheeled chassis and a liquid reservoir integral with the wheeled chassis, the reservoir assembly further including a wall at a portion of the periphery of the reservoir assembly, the wall integral with the reservoir assembly and comprising a plurality of openings; upwardly extending structure removably connectable to the reservoir assembly via one or more of the plurality of openings; the liquid reservoir comprising a circumferential sidewall including an upper end, with the wall that is at the portion of the periphery of the reservoir assembly being at the liquid reservoir upper end, the wall comprising a top wall of the liquid reservoir; and the top wall including a first section at one of a liquid reservoir front right portion and a liquid reservoir front left portion, the first section including a channel, the channel configured to assist in guiding a liquid from the liquid reservoir when the liquid reservoir contains a liquid and a user chooses to drain the liquid via the first section of the top wall.

11. The cleaning cart system of claim 10 wherein the channel is constructed and arranged to receive a downwardly extending base portion of a bin.

12. The cleaning cart system of claim 11 wherein the first section top wall includes an outer edge, and the channel stops short of the outer edge, thereby forming a wall portion at an outer end of the channel.

13. The cleaning cart system of claim 12 wherein the top wall includes a second section at the other of the liquid reservoir front right portion and the liquid reservoir front left portion, the second section including a channel, the channel configured to assist in guiding a liquid from the liquid reservoir when the liquid reservoir contains a liquid and a user chooses to drain the liquid via the second section of the top wall, the channel constructed and arranged to receive a downwardly extending base portion of a bin.

14. A cleaning cart system, comprising: a reservoir assembly, the reservoir assembly including a wheeled chassis and a liquid reservoir integral with the wheeled chassis, the reservoir assembly further including a wall at a portion of the periphery of the reservoir assembly, the wall integral with the reservoir assembly and comprising a plurality of openings; upwardly extending structure removably connectable to the reservoir assembly via one or more of the plurality of openings; and the liquid reservoir comprising a back wall, the system further comprising a spigot fluidly connected to the liquid reservoir, and an extension arm rearward of the back wall, the extension arm connected to the spigot and including an upwardly extending section, whereby a user may operate the spigot between a fully open position and a fully closed position by rotating the extension arm.

15. The cleaning cart system of claim 14 further comprising a first protective wall member that extends rearward from the back wall and that is integral with the back wall, at least a portion of the first protective wall member extending rearward of the extension-arm upwardly extending section.

16. The cleaning cart system of claim 15 further comprising a second protective wall member that extends rearward from the back wall and that is integral with the back wall, at least a portion of the second protective wall member extending rearward of the extension-arm upwardly extending section.

17. The cleaning cart system of claim 16 wherein one of the first and second protective wall members is located to the right of the upwardly extending section, and the other of the first and second protective wall members is located to the left of the upwardly extending section.

18. The cleaning cart system of claim 17 wherein the back wall includes a forwardly oriented recess that extends from a lower end of the back wall in the direction of an upper end of the back wall, and a portion of the extension-arm upwardly extending section is positioned in the recess.

19. The cleaning cart system of claim 18 wherein the reservoir assembly includes a back, and the wheeled chassis includes a pair of wheels at the reservoir assembly back, the wheels extending rearward of the spigot, whereby the wheels assist in protecting the spigot and the extension arm, and whereby a user may move the cleaning cart system up and down a set of stairs by contacting the wheels or the first and second protective wall members with the stairs.

20. The cleaning cart system of claim 1 wherein the downwardly extending base portion of the one of the modular cleaning bins comprises a leg, and the one of the top-wall plurality of openings corresponds with the leg, whereby the leg may be positioned in the one of the top-wall plurality of openings, with the leg and the corresponding one of the top-wall plurality of openings cooperating to assist in providing stable support for the one of the modular cleaning bins when the one of the modular cleaning bins is positioned on the top wall and the leg is positioned in the one of the top-wall plurality of openings.

21. The cleaning cart system of claim 2 wherein the channel is constructed and arranged to receive a downwardly extending base portion of the one of the modular cleaning bins, thereby assisting in providing stable support for the one of the modular cleaning bins when the one of the modular cleaning bins is positioned on the top wall and the downwardly extending base portion of the one of the modular cleaning bins is positioned in the channel.

22. The cleaning cart system of claim 21 wherein the downwardly extending base portion of the one of the modular cleaning bins comprises a leg, and the channel is constructed and arranged to receive the leg, whereby the leg may be positioned in the channel, with the leg and the channel cooperating to assist in providing stable support for the one of the modular cleaning bins when the one of the modular cleaning bins is positioned on the top wall and the leg is positioned in the channel.

23. The cleaning cart system of claim 22 wherein the first section includes an outer edge, and the channel stops short of the outer edge, thereby forming a wall portion at an outer end of the channel, the wall portion further assisting in providing stable support for the one of the modular cleaning bins when the one of the modular cleaning bins is positioned on the top wall and the leg is positioned in the channel.

24. The cleaning cart system of claim 3 further comprising a second protective wall member that extends rearward from the back wall and that is integral with the back wall, at least a portion of the second protective wall member extending rearward of the extension-arm upwardly extending section.

25. The cleaning cart system of claim 24 wherein one of the first and second protective wall members is located to the right of the upwardly extending section, and the other of the first and second protective wall members is located to the left of the upwardly extending section.

26. The cleaning cart system of claim 25 wherein the back wall includes a forwardly oriented recess that extends from a lower end of the back wall in the direction of an upper end of the back wall, and a portion of the extension-arm upwardly extending section is positioned in the recess.

27. The cleaning cart system of claim 26 wherein the reservoir assembly includes a back, and the wheeled chassis includes a pair of wheels at the reservoir assembly back, the wheels extending rearward of the spigot, whereby the wheels assist in protecting the spigot and the extension arm, and whereby a user may move the cleaning cart system up and down a set of stairs by contacting the wheels or the first and second protective wall members with the stairs.

28. The cleaning cart system of claim 7 wherein the upwardly extending structure includes a handle, whereby a user may maneuver and steer the cleaning cart system via the handle.

29. The cleaning cart system of claim 7 further comprising a cleaning bin, the cleaning bin including a downwardly extending base portion comprising a leg, at least one of the plurality of openings corresponding with the leg, whereby the leg may be positioned in the corresponding opening, with the leg and the corresponding opening cooperating to assist in providing stable support for the cleaning bin when the cleaning bin is positioned on the liquid reservoir assembly and the leg is positioned in the corresponding opening.

30. The cleaning cart system of claim 10 wherein the upwardly extending structure includes a handle, whereby a user may maneuver and steer the cleaning cart system via the handle.

31. The cleaning cart system of claim 10 further comprising a cleaning bin, the cleaning bin including a downwardly extending base portion comprising a leg, with the channel constructed and arranged to receive the leg, whereby the leg may be positioned in the channel, with the leg and the channel cooperating to assist in providing stable support for the cleaning bin when the cleaning bin is positioned on the top wall and the leg is positioned in the channel.

32. The cleaning cart system of claim 14 wherein the upwardly extending structure includes a handle, whereby a user may maneuver and steer the cleaning cart system via the handle.

* * * * *